United States Patent [19]
Gordon et al.

[11] Patent Number: 5,758,898
[45] Date of Patent: Jun. 2, 1998

[54] REAR AXLE SUSPENSION FOR A MOTOR VEHICLE

[75] Inventors: Geoffrey Lawrence Gordon, Novi; Stanley Jay Novak, Dearborn; Russell Robert Brown, Livonia; Donald Lee Gibboney, Dearborn Heights; Donald Gayle Rathgeber, Livonia, all of Mich.

[73] Assignee: Ford Global Technologies, Inc., Dearborn, Mich.

[21] Appl. No.: 498,383

[22] Filed: Jul. 5, 1995

[51] Int. Cl.$^6$ .................. B60G 21/00; B60G 11/14
[52] U.S. Cl. .................................. 280/725; 280/689
[58] Field of Search ........................ 280/689, 701, 280/703, 724, 725, 713, 711, 726, 685

[56] References Cited

U.S. PATENT DOCUMENTS

| | | | |
|---|---|---|---|
| 3,231,040 | 1/1966 | Blanchette | 280/725 |
| 3,259,201 | 7/1966 | Allison | 280/723 |
| 3,332,702 | 7/1967 | Rosenkrands . | |
| 3,583,725 | 6/1971 | Fry | 280/724 |
| 3,777,838 | 12/1973 | Barnes . | |
| 4,029,338 | 6/1977 | Headley | 280/725 |
| 4,087,116 | 5/1978 | Morimoto | 280/724 |
| 4,341,397 | 7/1982 | Morimura et al. | 280/724 |
| 4,344,643 | 8/1982 | Ray | 280/724 |
| 4,410,201 | 10/1983 | Iijima et al. | 280/725 |
| 4,453,738 | 6/1984 | Murata et al. | 280/725 |

*Primary Examiner*—Paul N. Dickson
*Attorney, Agent, or Firm*—Gregory P. Brown

[57] ABSTRACT

A suspension system for the rear wheels (12, 14) of a motor vehicle that are interconnected by an axle housing (10). In the preferred embodiment, the axle housing (10) is positioned by a pair of lower control arms (18, 20), upper control arms (32, 34) and a pair of lateral control links (70, 72). The arrangement provides improved lateral stability for the rear axle (10) and a lower effective roll center.

14 Claims, 3 Drawing Sheets

REAR AXLE SUSPENSION FOR A MOTOR VEHICLE

BACKGROUND OF THE INVENTION

1. Field of the Invention

This invention relates generally to suspensions systems for motor vehicles. More particularly, the present invention provides a live rear axle suspension having lateral locating links for improving the lateral control of the rear axle.

2. Disclosure Information

The principal function of the vehicle suspension system is to provide an articulated connection between the vehicle's wheels and chassis so that the wheel may traverse a jounce and rebound path when the vehicle is driven over an irregular surface. A suspension also includes a spring device for resiliently supporting the chassis upon the wheels. In addition to permitting jounce and rebound movement of the wheels, a good suspension system will control the path of the wheels so that certain operating advantages may be realized. For example, the suspension can control the tendency of the body to lean when the vehicle is cornering and it can also control the tendency of the rear end to lift on braking or squat on acceleration. Further, a suspension system for the rear driving wheels of a motor vehicle must stabilize the axle against braking and acceleration torque.

The operation of the suspension system during cornering maneuvers may be objectively and subjectively characterized under static and dynamic operating conditions. The static operating characteristics may be determined by evaluating the vehicle performance as the vehicle is driven around a circle of a given radius on a skid pad. The vehicle may also be subjected to transient operating conditions, under which the vehicle is steered right to left through a slalom course. Both static and dynamic operating conditions generate a lateral force acting on the suspension. The lateral force displaces the suspension laterally in proportion to the lateral compliance of the suspension, which can cause a lateral steer effect. It has been determined that a suspension system having greater lateral compliance may not provide satisfactory operational characteristics under both static and dynamic conditions, due to the changing lateral steer effects under the dynamic conditions.

It would be desirable to have an rear suspension with very low lateral compliance to allow simplified suspension tuning by providing similar operational characteristics under both static and dynamic operation. Additionally, it would be desirable to provide a suspension system with a low roll center capable of being produced for a minimal cost and requiring no additional body attachment points.

SUMMARY OF THE INVENTION

The present invention provides a rear axle suspension apparatus for supporting a chassis of a motor vehicle having an axle housing having right and left outer axle ends and a midpoint centered between the outer axle ends and a road wheel positioned at each of the outer axle ends of the axle housing. The suspension also includes right and left lower control arms having forward lower ends pivotally attached to the chassis and rearward lower ends pivotally attached to the axle housing adjacent to the outer axle ends. These lower control arms cooperate with an upper control arm having a forward upper end pivotally attached to the chassis and a rearward upper end pivotally attached to the axle housing adjacent to the midpoint.

The chassis is supported on right and left spring members disposed between the right and left lower control arms, respectively, and the chassis. Dynamic motions of the chassis are controlled with right and left shock absorbers disposed between the axle housing and the chassis.

The lateral stability and the roll center location provided by the lower and upper control arms are improved by the addition of right and left lateral control links. The lateral control links have outer link ends connected to the right and left lower control arms adjacent to the forward lower ends, respectively, and further have inner link ends pivotally connecting to the axle housing adjacent to the center of the axle below the upper arm rearward end.

An advantage of this rear axle suspension apparatus is the improved lateral stability of the rear axle for minimal additional costs. Costs are minimized because the system requires no additional attachment points to the chassis. Furthermore, the resultant roll center is considerably lower than would be possible without the lateral control links, which reduces the roll stiffness that may negatively effect ride and harshness qualities of the vehicle.

Other objects, features and advantages of the present invention will become apparent to those skilled in the art from the drawings, detailed description and claims which follow.

DETAILED DESCRIPTION OF THE PREFERRED EMBODIMENT

Figure 1:
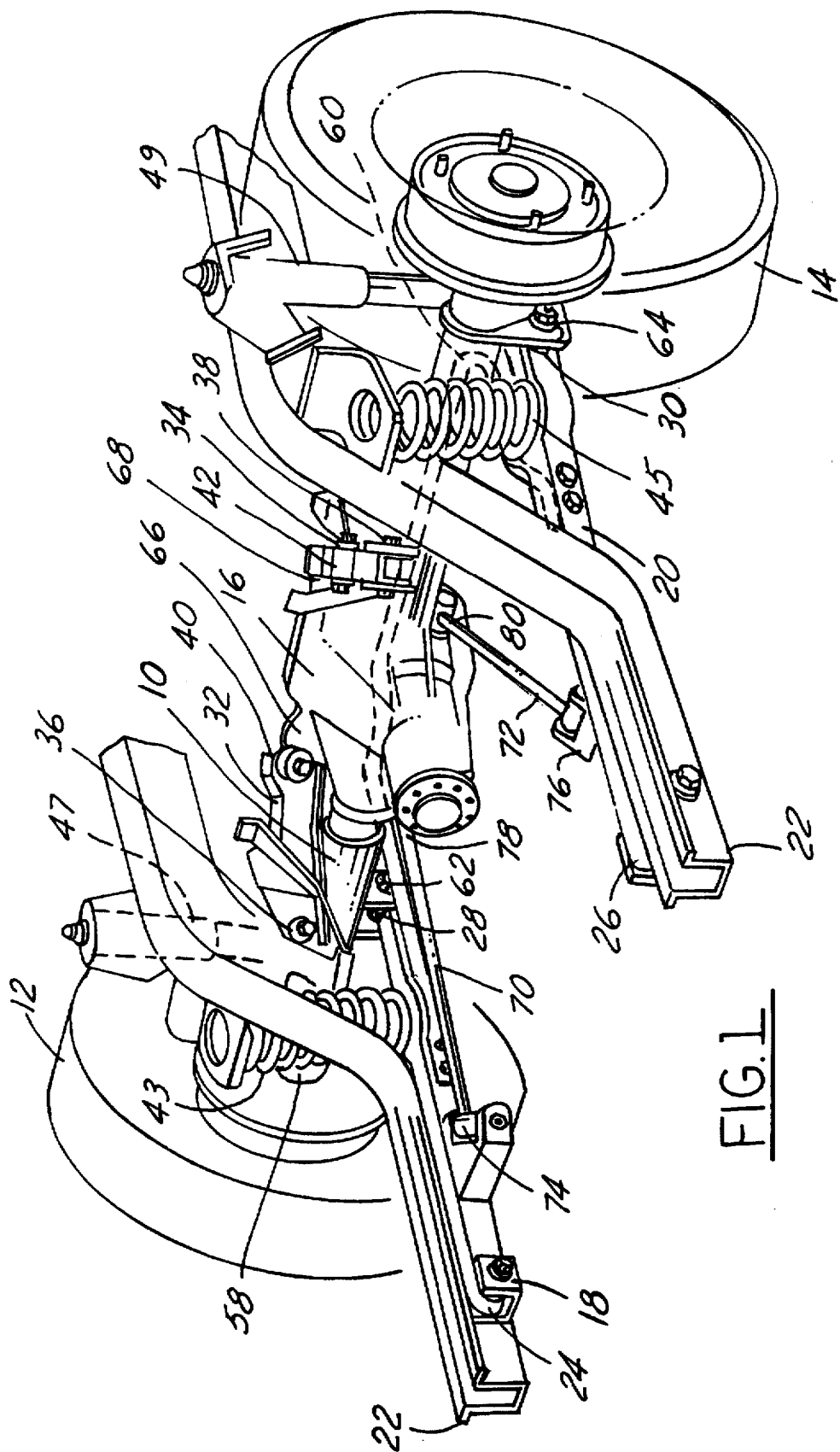
FIG. 1 is a perspective view of a portion of a motor vehicle suspension incorporating the preferred embodiment of this invention.
Figure 2:
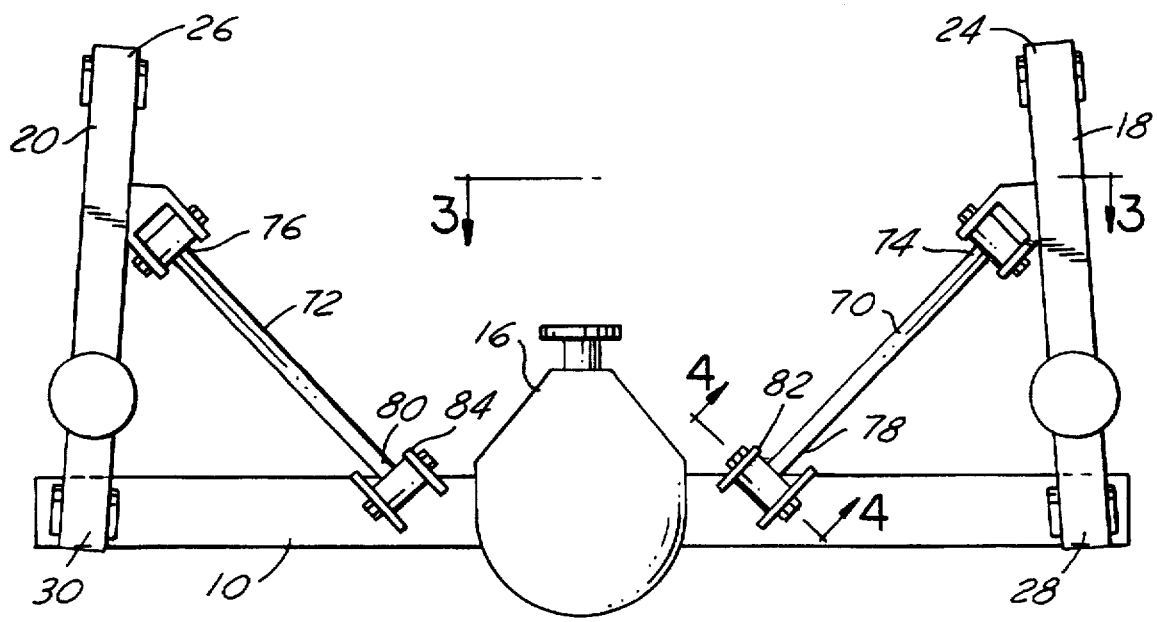
FIG. 2 is a bottom view of the suspension system of FIG. 1.
Figure 3:
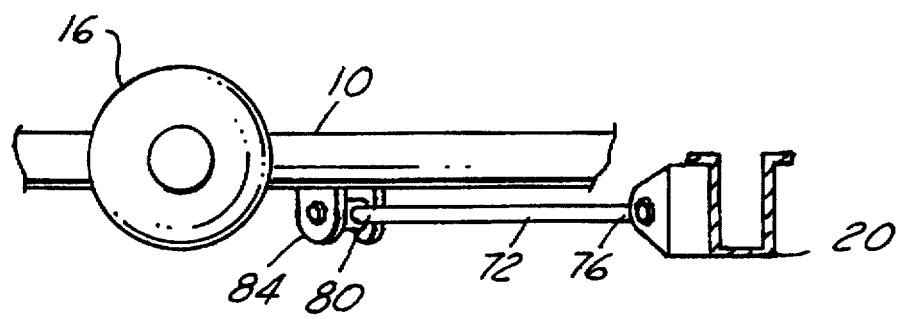
FIG. 3 is a partial front elevational view of the suspension system of FIG. 1.

Referring now to FIGS. 1–3, a rear suspension system for a motor vehicle having a rigid axle housing 10 that interconnects right and left road wheels 12, 14 is shown. The axle housing 10 may include differential gearing contained within a differential housing 16. The differential gearing is connected to a powertrain in a conventional fashion and distributes driving torque through the axle shafts within the axle housing 10 to the road wheels 12, 14. Alternatively, for a non-driven axle, the rigid axle housing 10 would consist of a simple beam extending between the right and left wheels 12, 14.

Symmetrically arranged right and left lower arms 18, 20 connect the axle housing 10 to a chassis frame 22 constructed in accordance with the principles of either unitized or body-on-frame design. The right and left lower arms 18, 20 have forward lower ends 24, 26 pivotally attached to the chassis 22 and rearward lower ends 28, 30 pivotally attached to the axle housing 10. Symmetrically arranged right and left upper arms 32, 34 connect the differential housing 16 to the chassis 22. The right and left upper arms 32, 34 have forward upper ends 36, 38 pivotally attached to the chassis 22 and rearward upper ends 40, 42 pivotally attached to the differential housing 16, which is located on a midpoint of the axle housing 10. The forward upper ends 36, 38 of the upper arms are skewed substantially from a longitudinal axis of the motor vehicle. In the presently preferred embodiment, they are skewed substantially forty five degrees from the longitudinal axis.

The suspension system supports the chassis 22 on the lower control arms 18, 20 with left and right coil type suspension springs 43, 45. The suspension also uses right and left telescopic shock absorbers 47 and 49 interposed between the axle housing 10 and the chassis 22 to control the vertical oscillations of the chassis 22 relative to the axle housing 10.

Figure 4:
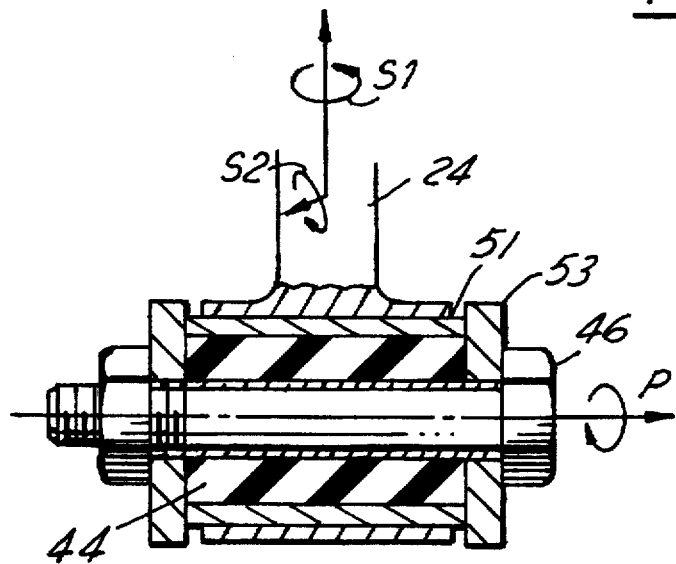
FIG. 4 is a sectional view taken from FIG. 1 showing a pivotal attachment of a lateral link to a lower arm according to the present invention.

Referring now to FIG. 4, each end of the lower and upper arms is provided with an aperture 51, as shown on the right forward lower end 24, to receive a rubber bushing 44. In the presently preferred embodiment, the bushing 44 is of the enclosed cartridge style, which enhances the durability of the bushing 44. A threaded fastener 46 pivotally secures the bushing 44 and the end of the arm 24 to a attachment member 53 the adjoining component, which may be a bracket on the chassis 22, lower control arm 18,20, axle housing 10 or differential housing 16. The primary axis for rotation, P. in each bushing 44 is oriented normal to the longitudinal axis of the associated arm, substantially in the horizontal plane, thus allowing unconstrained vertical motion of the axle housing 10 and differential housing 16. The bushings 44 restrict rotation about the remaining secondary, S1, S2, rotational axes of the bushing 44. The first of these two, S1, being defined as the axis of rotation about the longitudinal axis of the arm. The second of these two, S2, being defined as normal to the plane defined by the longitudinal axis of the arm and to the primary axis for rotation of the bushing 44. Rotation about these two axes is initially controlled by the resiliency of the elastomeric material used. However, rotation is limited by the interference between the aperture 51 and the attachment member 53 of the adjacent component.

Referring back now to FIGS. 1–3, right and left outer axle ends 58, 60 of the axle housing 10 have depending brackets 62, 64 to which the rearward lower ends 28, 30 of the right and left lower arms 18, 20 pivotally attach. Similarly, the differential housing 16 has right and left cast brackets 66, 68 formed integrally in the differential housing 16 to which the rearward upper ends 40, 42 of the right and left upper arms 32, 34 pivotally attach.

Symmetrically arranged right and left lateral control links 70, 72 connect the axle housing 10 to the right and left lower control arms 18, 20. The right and left lateral control links 70, 72 have outer link ends 74, 76 pivotally attached as far forward on the lower control arms 18, 20 as package space will permit. Similarly, the right and left lateral control links 70, 72 have inner link ends 78, 80 pivotally attached as close to the center of the axle housing 10 as possible. In the presently preferred embodiment, the inner link ends 78, 80 attach to inner end brackets 82, 84 secured to the axle housing 10 adjacent to the differential housing 16. When the right and left lateral control links are used in combination with upper control arms 32, 34, as in the presently preferred embodiment, the lateral control links 70, 72 preferably lie in the plane established by the lower control arms 18, 20.

Each inner and outer link end of the lateral control links 70, 72 include an aperture to receive a elastomeric bushing similar in construction and operation to that of bushing 44 shown in FIG. 4. The inventors have observed that substituting rigid connections for the bushings 44 causes the lateral control links 70, 72 to increase the roll stiffness of the suspension. The bushings 44 allow the roll stiffness to be decoupled from the lateral control provided by the later control links 70, 72 which simplifies tuning of both lateral compliance and roll stiffness. Additionally, the effective roll center can be tuned by varying the resiliency of the bushings in the lateral control links 70, 72 relative to the resiliency in the bushings in the upper control arms 32, 34.

In the presently preferred embodiment, the bushings 44 in the lateral control links 70, 72 are constructed with a less resilient elastomer than the bushings 44 used in the upper control arms 32, 34. In operation it is desirable to have the bushings 44 in the upper control arms 32, 34 as soft as possible, but stiff enough to provide stability of the axle housing 10 during powertrain induced acceleration. The upper control arms 32, 34 resist the accelerating and braking torque that have a tendency to cause the axle housing 10 to rotate. On the other hand, the bushings 44 used in the lateral control links 70, 72 are preferably more resilient, thereby providing the dominant roll control and determining the location of the suspensions effective roll center.

Figure 5:
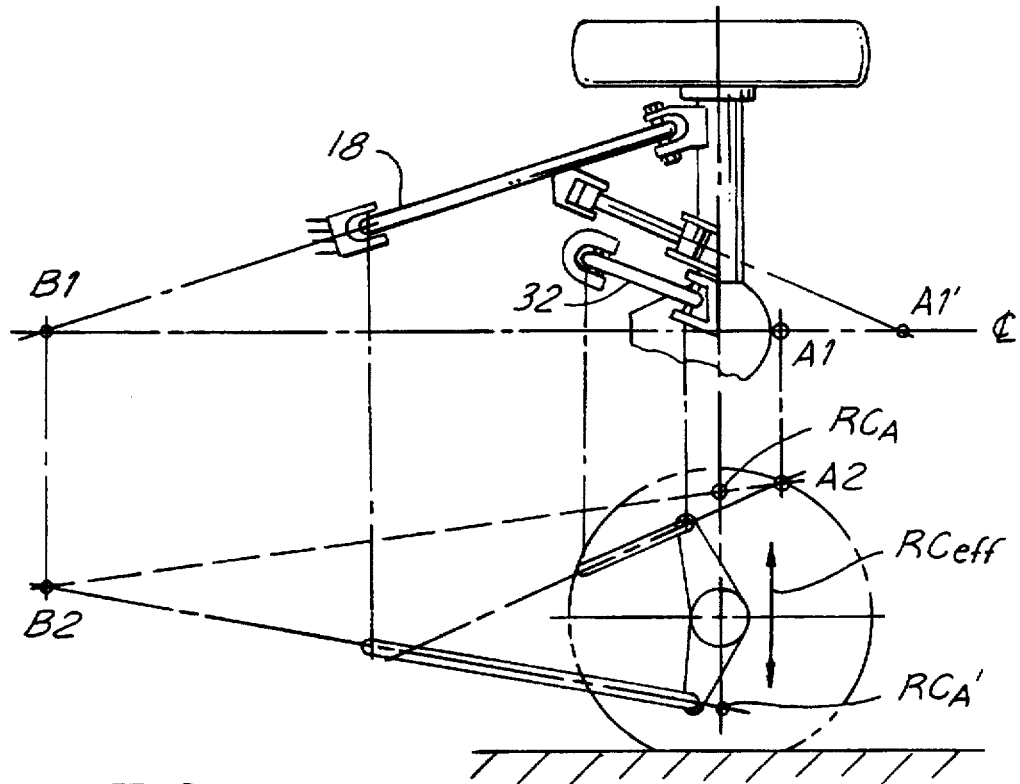
FIG. 5 is a combined top and side elevational view of a motor vehicle suspension showing an effective roll center for a suspension according to the present invention.

The is illustrated in FIG. 5, where the effective roll center of the presently preferred suspension system is shown with the suspension in its design ride height position. The upper portion of FIG. 5 illustrates a top view of the suspension system aligned over a side elevational view of the suspension system. The roll center due to the upper control arms 32, 34 may be determined by locating their instant center, A1, by extending a line from the arm 32 through the vehicle center line, CL. Next, the instant center, B1, of the lower control arms 18, 20 is determined by extending a line forward from the lower control arm 18 to a point where it intersects the vehicle centerline, B1. Now, the roll axis of the rear suspension due to the upper control arms may be found by projecting a line forward along the longitudinal axis of the lower control arm until it intersects a line dropped down from point B1 at point B2. Next, a line is projected rearward along the longitudinal axis of the upper control arm until it intersects a line dropped down from point A1 at point A2. A line drawn between points A2 and B2 defines the roll axis due to the upper control arms 32, 34. The roll center due to the upper control arms, RCA, is determined by the intersection of the roll axis and a vertical line extended through the center of the axle housing 10.

Similarly, the instant center A1' for the lateral control links 70, 72 is used to determine the roll axis due to the lateral control links. The roll center due to the lateral control links, RCA' is determined by the intersection of the roll axis due to the lateral control links and the vertical line extended through the center of the axle housing 10. The effective roll center, $RC_{ep}$ for the suspension falls somewhere on a line extended between RCA and RCA'. To provide the lowest possible effective roll center, $RC_{ep}$ the bushings 44 in the upper control arm are constructed with an elastomer that is significantly more compliant than the elastomer used for the bushings 44 in the lateral control links 70, 72 as described above.

The present invention therefore provides a lower roll center for improved static and dynamic vehicle maneuvers. Additionally, by triangulating the lower control arms 18, 20 with the substantially rigid axle housing 10, the lateral stability of the rear suspension is significantly improved. Preventing unwanted lateral deflection of the axle housing 10 significantly improves the dynamic characteristics of the rear suspension.

The foregoing description presents a single embodiments of the present invention. Details of construction have been shown and described for purposes of illustration rather than limitation. For instance, it should occur to those skilled in the art that the upper control arms, 32, 34 could be replaced by a single upper control arm aligned parallel to the center line of the vehicle. Similarly, various end connections, including spherical rod ends, could be substituted for the bushings 44. Other modifications and alterations of the invention will no doubt occur to those skilled in the art that will come within the scope and spirit of the following claims.

We claim:

1. A rear axle suspension apparatus supporting a chassis of a motor vehicle, said rear axle suspension apparatus comprising:

an axle housing having right and left outer axle ends and a midpoint centered between said outer axle ends;

a road wheel positioned at each of said outer axle ends of said axle housing;

right and left lower control arms having forward lower ends pivotally attached to said chassis and rearward lower ends pivotally attached to said axle housing adjacent to said outer axle ends;

an upper control arm having a forward upper end pivotally attached to said chassis and a rearward upper end pivotally attached to said axle housing adjacent to said midpoint;

right and left spring members disposed between said right and left lower control arms, respectively, and the chassis;

right and left shock absorbers disposed between said axle housing and the chassis; and right and left rigid lateral control links having outer link ends connected to said right and left lower control arms adjacent to said forward lower ends, respectively, and further having inner link ends pivotally connected to said axle housing adjacent to said center of said axle below said upper arm rearward ends.

2. A rear axle suspension apparatus according to claim 1, wherein an instant center of said upper control arm is disposed rearward of an instant center of said lower control arms.

3. A rear axle suspension apparatus according to claim 1, wherein an instant center of said lateral control links is disposed rearward of an instant center of said lower control arms.

4. A rear axle suspension apparatus according to claim 1, further comprising right and left upper control arms having forward upper ends pivotally attached to said chassis and rearward upper ends pivotally attached to said axle housing adjacent to said midpoint.

5. A rear axle suspension apparatus according to claim 4, comprising an effective roll center disposed between a roll center due to said upper control arms and a roll center due to said lateral control links.

6. A rear axle suspension apparatus according to claim 1, wherein said outer link ends of said right and left lateral control links are pivotally connected to said right and left lower control arms.

7. A rear axle suspension apparatus according to claim 6, further comprising a bushing disposed between said outer link ends and said lower control arms, said bushings having a primary axis for rotation oriented normal to a longitudinal axis of said lateral control link and being substantially in a horizontal plane.

8. A rear axle suspension apparatus according to claim 6, wherein said upper control arms provide greater compliance than said lateral control links.

9. A rear axle suspension apparatus supporting a chassis of a motor vehicle, said rear axle suspension apparatus comprising:

a rigid axle housing having right and left outer axle ends and a midpoint centered between said outer axle ends;

a road wheel positioned at each of said outer axle ends of said axle housing;

right and left lower control arms having forward lower ends pivotally attached to said chassis and rearward lower ends pivotally attached to said axle housing adjacent to said outer axle ends;

right and left upper control arms having forward upper ends pivotally attached to said chassis and rearward upper ends pivotally attached to said axle housing adjacent to said midpoint;

right and left spring members disposed between said right and left lower control arms, respectively, and the chassis;

right and left shock absorbers disposed between said axle housing and the chassis; and right and left rigid lateral control links having outer link ends pivotally connected to said right and left lower control arms adjacent to said forward lower ends, respectively, and further having inner link ends pivotally connected to said axle housing adjacent to said center of said axle below said upper arm rearward ends.

10. A rear axle suspension apparatus according to claim 9, wherein an instant center of said upper control arm is disposed rearward of an instant center of said lower control arms.

11. A rear axle suspension apparatus according to claim 9, wherein an instant center of said lateral control links is disposed rearward of an instant center of said lower control arms.

12. A rear axle suspension apparatus according to claim 9, comprising an effective roll center disposed between a roll center due to said upper control arms and a roll center due to said lateral control links.

13. A rear axle suspension apparatus according to claim 9, further comprising a bushing disposed between said outer link ends and said lower control arms, said bushings having a primary axis for rotation oriented normal to a longitudinal axis of said lateral control link and being substantially in a horizontal plane.

14. A rear axle suspension apparatus according to claim 9, wherein said upper control arms provide greater compliance than said lateral control links.

* * * * *